(12) United States Patent
Anglin et al.

(10) Patent No.: US 10,140,561 B2
(45) Date of Patent: Nov. 27, 2018

(54) COGNITIVE LOCALIZATION FOR ENHANCING APPLIANCE CONDITIONING FEATURES

(71) Applicant: International Business Machines Corporation, Armonk, NY (US)

(72) Inventors: Debbie A. Anglin, Austin, TX (US); Su Liu, Austin, TX (US); Fang Wang, Austin, TX (US); Charles D. Wolfson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 147 days.

(21) Appl. No.: 15/260,532

(22) Filed: Sep. 9, 2016

(65) Prior Publication Data
US 2018/0075329 A1 Mar. 15, 2018

(51) Int. Cl.
  *G06F 17/30* (2006.01)
  *G06K 19/077* (2006.01)
  *G06K 7/10* (2006.01)
  *G06K 17/00* (2006.01)

(52) U.S. Cl.
  CPC ... *G06K 17/0022* (2013.01); *G06F 17/30598* (2013.01); *G06F 17/30879* (2013.01); *G06K 7/10465* (2013.01); *G06K 19/07758* (2013.01)

(58) Field of Classification Search
  None
  See application file for complete search history.

(56) References Cited

U.S. PATENT DOCUMENTS

| 9,159,013 | B2 | 10/2015 | Zhao et al. |
| 9,277,601 | B2 | 3/2016 | Bandholz et al. |
| 9,818,007 | B1* | 11/2017 | Bajovic ............ G06K 7/10386 |
| 2007/0200712 | A1 | 8/2007 | Arneson et al. |
| 2011/0314163 | A1 | 12/2011 | Borins et al. |

(Continued)

FOREIGN PATENT DOCUMENTS

| CN | 104748504 | 7/2015 |
| WO | 2012116474 A1 | 9/2012 |

OTHER PUBLICATIONS

Anonymous, "Caring About the Consumers Beyond the Label", http://www.intertek.com/uploadedFiles/Intertek/Divisions/Consumer_Goods/Media/PDFs/Services/Low%20Res%20CompleteCareLabelling.pdf, 2014.

(Continued)

*Primary Examiner* — Suezu Ellis
(74) *Attorney, Agent, or Firm* — North Shore Patents, P.C.; Michele Liu Baillie

(57) ABSTRACT

A system for automated localization of information for smart appliances identifies a user of the smart appliance via a user interface. The system receives scanned input associated with an item from a scanning component. The system requests cognitive services from an appliance cognitive localization server, where the cognitive services integrates localization information with the item information. The system provides the localization information to the smart appliance, and operates the smart appliance using the localization information and the item information. The system retrieves the localization information and the item information from an item repository during a subsequent scan of the item using the scanning device.

21 Claims, 3 Drawing Sheets

(56) References Cited

U.S. PATENT DOCUMENTS

| | | | |
|---|---|---|---|
| 2014/0018962 A1* | 1/2014 | Jung | D06F 39/005 700/275 |
| 2015/0288835 A1 | 10/2015 | Fein et al. | |
| 2015/0312230 A1 | 10/2015 | Choi et al. | |
| 2016/0091874 A1* | 3/2016 | Colett | G06K 19/06037 235/385 |

OTHER PUBLICATIONS

Anonymous, "Laundry Care Label Checker" ISO & JIS,'" https://itunes.apple.com/us/app/laundry-care-label-checker/id473466192?mt=8, Apr. 20, 2016.

Anonymous, "NFC Washing Machine ", https://www.youtube.com/watch?v=W-W7o3Ruc80, Jun. 27, 2014.

Anonymous, "RFID Laundry Tracking: What Can It Do for You?", http://blog.atlasrfidstore.com/what-can-rfid-laundry-tracking-do, Apr. 16, 2015.

Anonymous, "'Smarter' Smart Washing Machine: In-Depth Demo With NXP (NFC, RFID) ", https://www.youtube.com/watch?v=gOa5piXcxis, Feb. 29, 2012.

Anonymous, "Universal Care Labels—Explained", http://verolinens.com/universal-care-labels-explained/, Apr. 20, 2016.

Anonymous, "Washing Care Labels and Garment Care Symbols With Care Instructions", http://www.clothinglabel.com/content/washing-care-labels-and-garment-care-symbols-care-instructions, Apr. 20, 2016.

Anonymous, "Whirlpool Corporation, IBM Collaborate on Cognitive Solutions for Connected Appliances", http://www.prnewswire.com/news-releases/whirlpool-corporation-ibm-collaborate-on-cognitive-solutions-for-connected-appliances-300200163.html, Jan. 6, 2016.

Anonymous, Twiggify, http://www.twiggify.com/en/types-of-fabrics, 2012.

Bonnema, "Smart Washer Demo Features RFID NFC", http://www.appliancedesign.com/articles/93065-smart-washer-demo-features-rfid-nfc, Mar. 1, 2012.

Claire Swedberg; NFC-Enabled Refrigerator Shares Data with Mobile Phones; RFID Journal; Aug. 5, 2013; http://www.rfidjournal.com.

Richard Schmidmaier; Interactive RFID and NFC Enable New Applications in Electronics; NXP Semiconductors; 2013; https://nxp-rfid.com.

Symonds, Judith, et. al, "Auto-Identification and Ubiquitous Computing Applications: RFID and Smart and Smart Technologies for Information Convergence", IGI Global, 2009, p. 184.

* cited by examiner

COGNITIVE LOCALIZATION FOR ENHANCING APPLIANCE CONDITIONING FEATURES

BACKGROUND

Smart appliances with an embedded Radio Frequency Identification (RFID) reader can provide intelligent information by reading RFID tags on items that interact with the smart appliance. For example, smart appliance refrigerators read RFID tags on food items in the refrigerators, track the expiration dates associated with the items, the temperature the food was maintained at, and the movement of those items in and out of the refrigerators. Smart appliance washing machines read the RFID tags of clothing items placed in the washer, and can use that information to suggest the proper washing cycle based on the garment care instructions for those items. Smart appliances can also provide real time assistance and localization services to customers regarding smart appliance usage, diagnosing problems, etc. However, existing localization services cannot cover all circumstances. Therefore, it would be helpful to enhance the smart appliance conditioning features with cognitive localization that can detect and provide localization services when new circumstances are encountered.

SUMMARY

According to an embodiment of the present invention, in a method for automating localization of information for smart appliances, the method identifies a user of the smart appliance via a user interface. The method receives, from a scanning component, scanned input associated with an item. The method requests cognitive services from an appliance cognitive localization server, where the cognitive services integrates localization information with the item information. The method provides the localization information to the smart appliance, and operates the smart appliance using the localization information and the item information. The method retrieves the localization information and the item information from an item repository during a subsequent scan of the item using the scanning device.

In an example embodiment, when the method identifies the user of the smart appliance via the user interface, the method obtains, from a user profile repository, at least one of a user preference and personalized service settings associated with the user, for operation of the smart appliance, where the user preference comprises a user preferred language.

In an example embodiment when the method receives, from the scanning device, scanned input associated with the item, the method analyzes an item type associated with the scanned input. The method then determines whether an item identifier associated with the scanned input resides in an item repository, and creates the item identifier if the item identifier is not in the item repository. The method determines an item type associated with the scanned input and catalogs the item into an item group.

In an example embodiment, when the method requests cognitive services from the appliance cognitive localization server, the cognitive services integrating localization information with the item information, the method determines, based on language information and encoding information associated with the item information and a user preferred language, that the item information is to be translated into the user preferred language as translated item information. The method sends a request to a cognitive service Application Programming Interface (API) for localization information associated with the item information. The method receives by at least one of the user and an appliance configuration Graphical User Interface (GUI), from a localization assistant interfacing with an appliance localization daemon, localization information and the translated item information to be used, by the smart appliance, during operation by the smart appliance. The method stores the localization information and the translated item information in an item repository.

DETAILED DESCRIPTION

Figure 1:
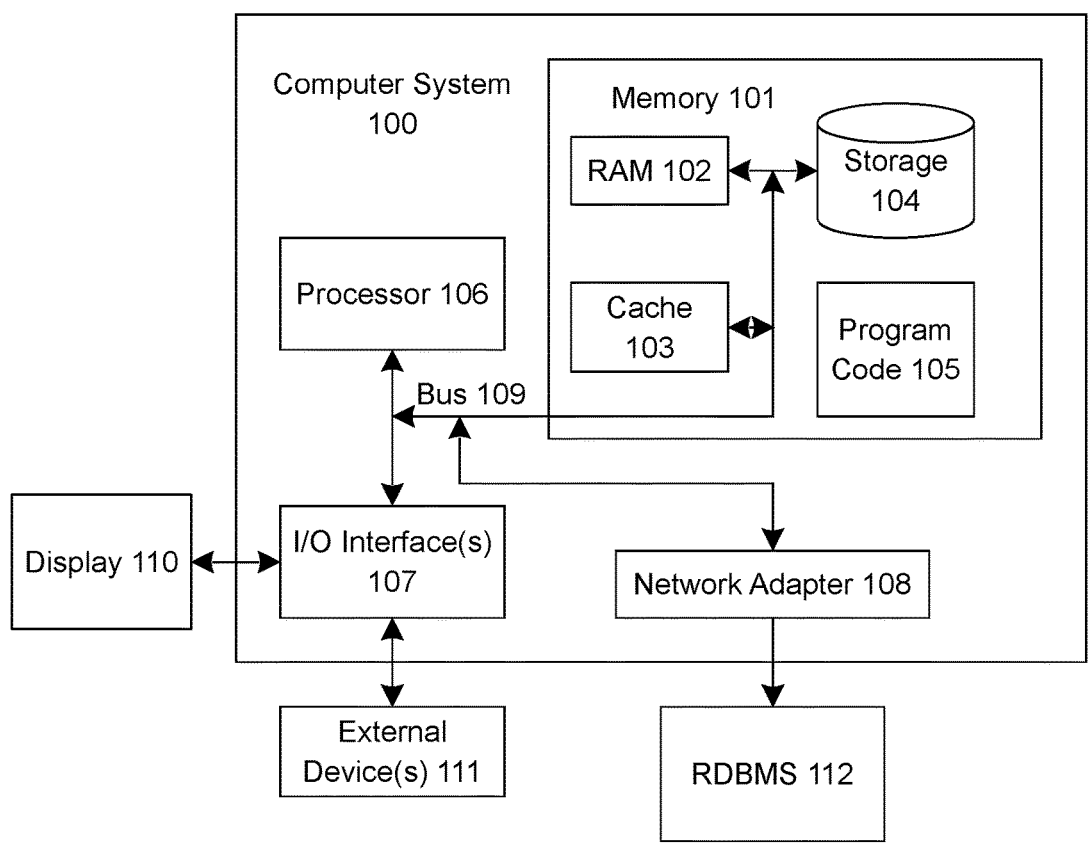
FIG. 1 illustrates an embodiment of a system for automating localization of information for smart appliances, according to embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 illustrates a system for sorting for automating localization of information for smart appliances according to embodiments disclosed herein. The computer system 100 is operationally coupled to a processor or processing units 106, a memory 101, and a bus 109 that couples various system components, including the memory 101 to the processor 106. The bus 109 represents one or more of any of several types of bus structure, including a memory bus or memory controller, a peripheral bus, an accelerated graphics port, and a processor or local bus using any of a variety of bus architectures. The memory 101 may include computer readable media in the form of volatile memory, such as random access memory (RAM) 102 or cache memory 103, or non-volatile storage media 104. The memory 101 may include at least one program product having a set of at least one program code module 105 that are configured to carry out the functions of embodiment of the present invention when executed by the processor 106. The computer system 100 may also communicate with one or more external devices 111, such as a display 110, via I/O interfaces 107. The computer system 100 may communicate with one or more networks via network adapter 108. The computer system 100 may communicate with one or more databases 112 via network adapter 108. In an example embodiment, the computer system 100 may be the smart appliance and/or the server.

Figure 2:
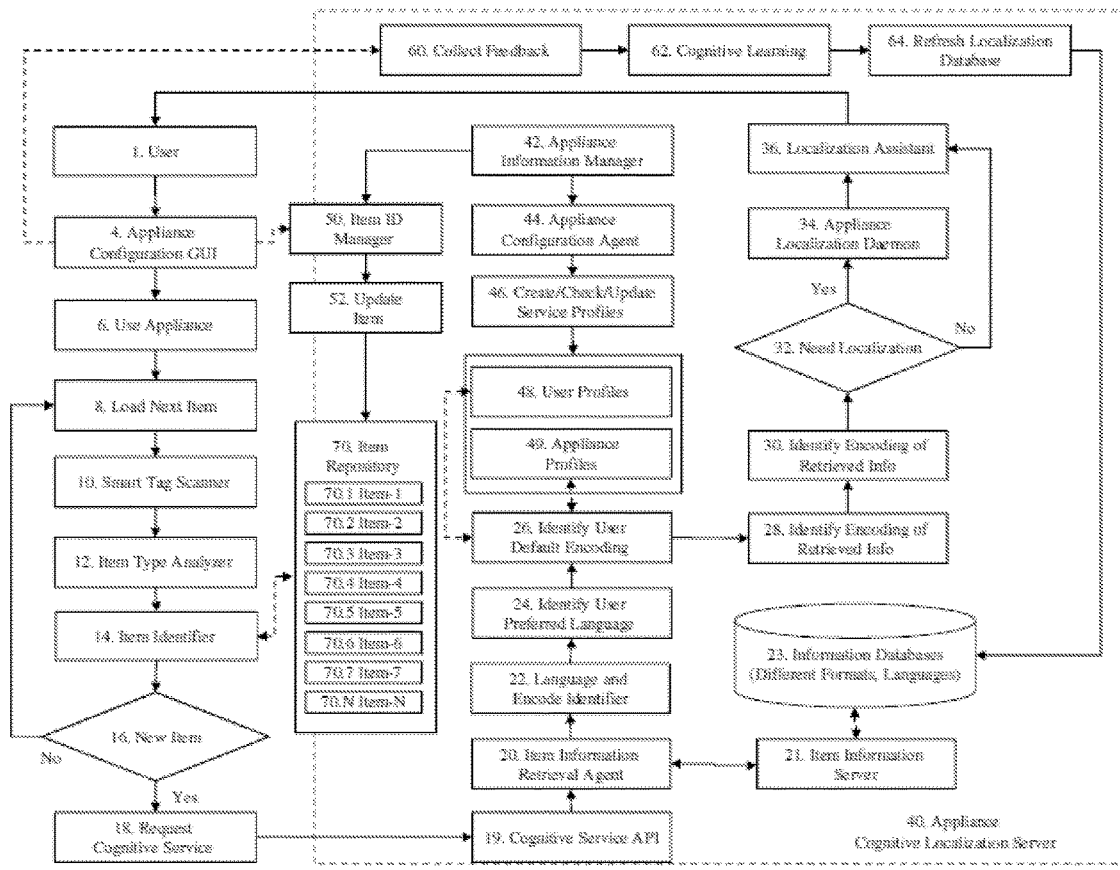
FIG. 2 is an example representation of a high level view of a system for automating localization of information for smart appliances, according to embodiments disclosed herein.

FIG. 2 is an example representation of an example representation of a high level view of a system for automating localization of information for smart appliances, according to embodiments disclosed herein. The Appliance Configuration GUI (4) is a user interface for configuring appliance assistant clients and servers. The Smart Tag Scanner (10) is a program/device for scanning loaded item smart tag. In an example embodiment, any type of scanning mechanism/device may be used. The Item Type Analyzer (12) is a program for analyzing item types and any related characteristics. The Item Identifier (14) is a program for identifying an item ID based on the inputs from Smart Tag Scanner. The Item ID Manager (50) is a program for managing IDs and related information. The Item ID Manager (50) can catalog items into different catalogs accordingly. For example, silk type fabric materials can be treated as a single group for requiring the same water temperature during a washing cycle. The Cognitive Service API (19) is an API for receiving client requests and passing the client requests to a set of sub APIs (for example, the Language and Encode Identifier (22), the Appliance Localization Daemon (34), etc.). The Language and Encode Identifier (22), User Preferred Language Identifier (24), and User Default Encoding Identifier (26) are a set of enhanced sub APIs (such as a Watson Language identifier API, or a Watson Code-set Identifier) for dynamically obtaining language and code set information based on an item ID and retrieved information associated with the item ID. The Item Repository (70) is a database for holding all related item information. The item information may be a type of fabric, a type of clothing, various washing instructions, etc. For example, washing instructions may be tied to fabric information, and can be used to catalog washing items. The Appliance Cognitive localization Server (40) is a localization server with specified appliance configuration for supporting real time localization service to support smart appliances. New items may be updated by the Appliance Cognitive Localization Server (40) after the Appliance Cognitive Localization Server (40) provides the cognitive service. The Appliance Information Manager (42) is a program for managing (such as adding/deleting/updating/setting up) profiles of a user, item, and/or appliance. The Appliance Configuration Agent (44) is a function for configuring any of the appliances and for configuring rules of assistant services. The Appliance Configuration Agent (44) can set default service language and encoding. The User Profile is a file for setting user preferences and personalized service settings. There may be multiple User Profiles, one for each user. The Appliance Profile is a file for containing appliance configuration settings (for example, the application type, model, predefined configuration rules, etc.). There may be multiple Appliance Profiles, one for each appliance. The Item Information Server (21) is a server for searching for (and saving) appliance and item instructions and information from an Information Databases (23) based on a received item ID. The Information Databases (23) can be updated by a cognitive learning component (Collect Feedback 60, Cognitive Learning 62, and Refresh Localization Database 64). The cognitive learning component (Collect Feedback 60, Cognitive Learning 62, and Refresh Localization Database 64) monitors the user-appliance operation interactions through Appliance Configuration GUI (4) to collect user feedback for cognitive leaning purpose. In an example embodiment, when a user receives a un-localized message from the Appliance Cognitive Localization Server (40) (for example, because the Information Databases (23) hasn't defined it in the user preferred language), the user may manually translates the message, and adds it as feedback. The cognitive learning component may then add the user translated message into the Information Databases (23). The Appliance Localization Daemon (34) is a server application for handling smart tag localization. Localization Daemon (34) can localizes smart tag information, data format, units, etc. For example, the water temperature can be automatically changed from 150 degree Fahrenheit to 65.6 degree Celsius for a Japanese user, according to user location. Or, a weight amount, such as "6 KG", can be cognitively localized to "13 lb and 3.6 oz" for a USA customer. There are no limits for supporting other related localization features.

Figure 3:
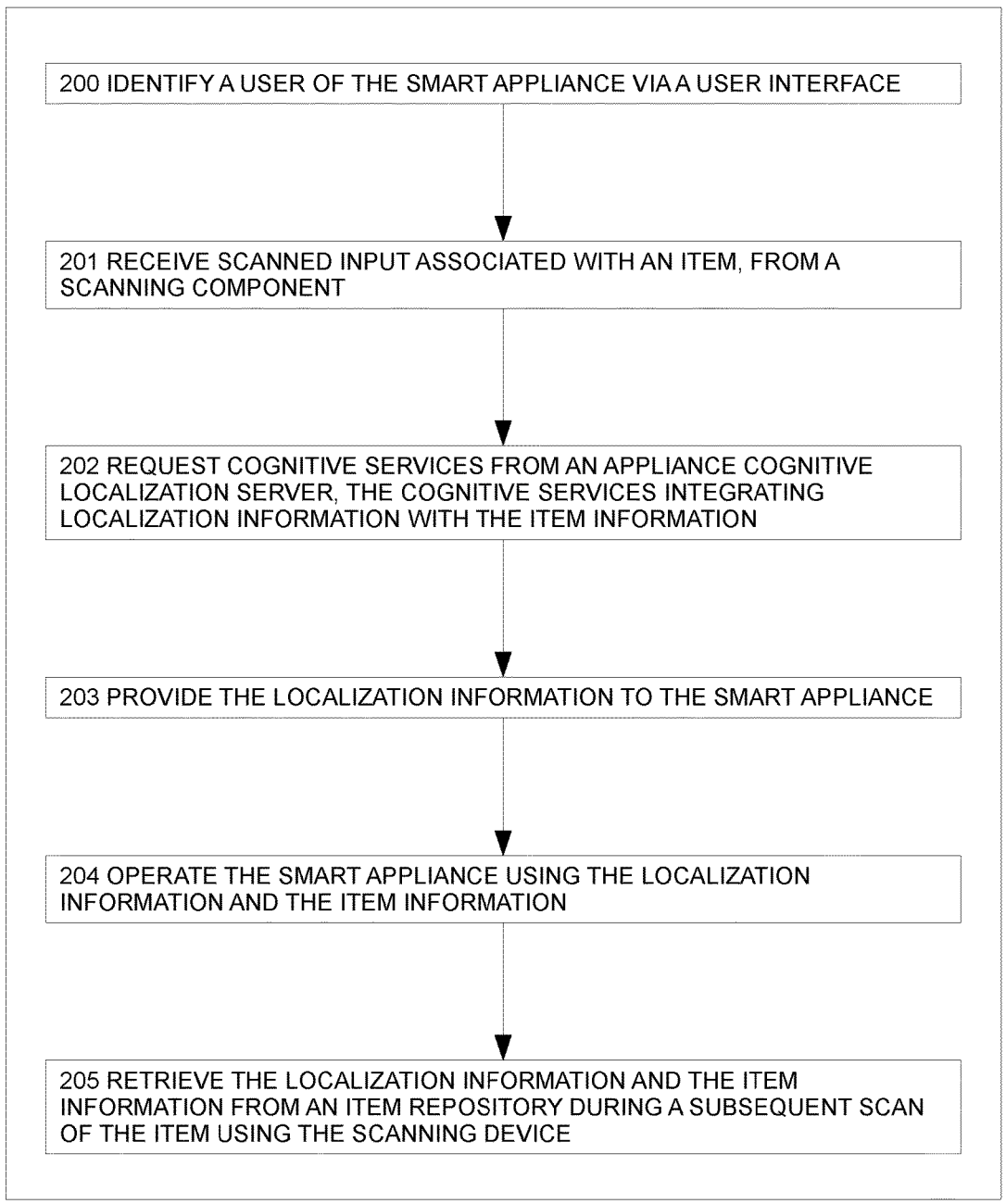
FIG. 3 is a flowchart illustrating an embodiment of a method for automating localization of information for smart appliances, according to embodiments disclosed herein.

FIG. 3 illustrates an embodiment of a method of automated localization of information for smart appliances. At 200, the method identifies a user of the smart appliance via a user interface. The user interface may reside on the user's personal device, such as a smart phone. The user interface may also reside on the smart appliance. The method may identify the user, via the user interface, when the user is in proximity to the smart appliance. For example, the method may detect that the user is near the smart appliance by detecting that that the user's smart phone is in the proximity of the smart appliance.

At 201, the method receives scanned input associated with an item, from a scanning component. For example, a user may place items containing RFID tags near the smart appliance (i.e., placing items near or in a refrigerator, washing machine, etc.). A RFID reader associated with the smart appliance detects that items with RFID tags are in proximity and reads/scans the information contained within the RFID tags on the items.

At 202, the method requests cognitive services from an appliance cognitive localization server, where the cognitive services integrates localization information with the item information. Both the smart appliance and the user may not understand, for example, how to properly wash the clothing items loaded into a smart appliance washing machine. This may be due to different culture conventions and languages between the smart appliance, the user, and/or the information on the RFID tags attached to the clothing items in the smart appliance washing machine. For example, the washing instructions on the RFID tags may be a combination of Fahrenheit and Celsius, and the smart appliance washing machine may set the washing temperature incorrectly if the suggested temperatures are not converted to a standard temperature used by the smart appliance washing machine. Or, clothing items purchased in the United States may have care labels written in English, whereas clothing items purchased in another country may have care labels written in the language of that country. Clothing items may have care labels that use different label code standards. Care labels of clothing items may be updated at any time, and even a smart appliance programmed at the manufacturer to handle all these different scenarios may still not be able to process new information on RFID tags. The method addresses this problem, and provides real-time assistance in the right language for diagnosing problems due to complex and/or new conditions on smart appliance usage and customer usage. For example, an RFID tag on a clothing item may have information (such as washing instructions for a clothing item) printed in a language that is foreign to the smart appliance, and/or smart appliance user. Or, for example, the washing instructions may reference a Celsius temperature, when the user prefers to use a Fahrenheit temperature (or the smart appliance may be programmed to use a Fahrenheit temperature). The method identifies the user of the smart appliance, scans the information from the RFID tag, and identifies that cognitive services are needed to translate the washing instructions on the RFID tag from the current language to a language that is understood by the user and/or the smart appliance. The method then requests the cognitive services from the appliance cognitive localization server to provide this information. In response, at 203, the method provides the localization information to the smart appliance (for example, providing the washing instructions in a language that the user understands, or converting the washing temperature from Celsius to Fahrenheit). The smart appliance can proactively recognize the right instructions and/or operations in a user preferred culture convention. The use of RFID tags reduce costs, simplify operations, and/or prevent mistakes. For example, a smart appliance washing machine, through the use of RFID tags attached to clothing items, can determine the fabric content and color of the items in the washing machine. The smart appliance can then determine the correct washing cycle (i.e., power, water usage, and water temperatures, etc.) for those items, preventing damage to delicate items, and selecting the most cost efficient washing cycle for those items.

At 204, the method operates the smart appliance using the localization information and the item information. For example, the smart appliance may begin a wash cycle using the water temperature converted from Celsius to Fahrenheit. The smart appliance may identify the color(s) of the clothing items in the smart appliance washing machine and modify the washing temperature so that the dyes in the clothing items will not run.

At 205, the method retrieves the localization information and the item information from an Item Repository (70) during a subsequent scan of the item using the scanning device. In an example embodiment, when the method encounters a new item, the method requests cognitive services from the appliance cognitive localization server (40) for the new item. The method provides the localization information for the new item to the smart appliance. If the localization information does not already exist in an Item Repository (70), the method stores the localization information for the new item in the Item Repository (70). Thus, when the new item is encountered during a subsequent scan, the method retrieves the localization information for that item from the Item Repository (70). In other words, the method provides real-time localization services to the smart appliance when the smart appliance encounters a new and/or unknown situation, and then stores that information so that the smart appliance has that information available the next time the smart appliance encounters the same situation.

In an example embodiment, when the method identifies the user of the smart appliance via the user interface, the method obtains, from a user profile repository, at least one of a user preference and personalized service settings associated with the user, for operation of the smart appliance. The user preference comprises a user preferred language. For example, the method identifies the user, and then, via the User Profiles Repository (48), and the User Preferred Language Identifier (24), the method identifies the user's preferred language. Thus, an English speaking user may travel to another country where English is not generally spoken, and the method will identify the user as an English speaking user, and present instructions and information on the smart appliance in English to the user via the Appliance Configuration GUI (4).

In an example embodiment, when the method receives scanned input associated with the item, from the scanning device, the method analyzes an item type associated with the scanned input, and determines whether an item identifier associated with the scanned input resides in an Item Repository (70). If not, the method creates the item identifier. For example, during the scanning of items into the smart appliance (i.e., placing items in a washing machine, refrigerator, etc.), the method identifies the items and creates an item ID if one does not already exist. The method may also determine an item type associated with the scanned item, and catalog the item into an item group. For example, the method may determine that the scanned item is a silk blouse with an RFID tag specifying washing instructions written in Japanese. The method invokes the localization services to translate the washing instructions into English. The method may also identify that the RFID tag (with the washing instructions written in Japanese) is not in the Item Repository (70). The method creates an item identifier for the RFID tag, and stores the item identifier in the Item Repository (70). The method may also catalog the item into the item group of, for example, "silk items" that would require similar washing instructions. Thus, the next time this particular RFID tag is scanned, the smart appliance will recognize the RFIG tag as a known entity.

In an example embodiment, when the method requests cognitive services from the appliance cognitive localization server, the method determines, based on language information and encoding information associated with the item information and a user preferred language, that the item information is to be translated into the user preferred language as translated item information. For example, clothing tags containing washing instructions may be written in any language. There may also be different types of fabrics, and different regions and vendors may use different care label code standards. In this scenario, the method may send a request to a cognitive service Application Programming Interface (API) (19) for localization information associated with the item information. The user and/or the appliance configuration Graphical User Interface (GUI) receives, from a localization assistant interfacing with an appliance localization daemon, localization information and the translated item information to be used, by the smart appliance and/or the user, during operation by the smart appliance. The method then stores the localization information and the translated item information in an Item Repository (70).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method of automated localization of information for smart appliances, the method comprising:
    identifying a user of the smart appliance via a user interface;
    receiving scanned input associated with an item, from a scanning component;
    requesting cognitive services from an appliance cognitive localization server, the cognitive services integrating localization information with the item information;
    providing the localization information to the smart appliance; and
    operating the smart appliance using the localization information and the item information.

2. The method of claim 1 further comprising:
    retrieving the localization information and the item information from an item repository during a subsequent scan of the item using the scanning component.

3. The method of claim 1 wherein identifying the user of the smart appliance via the user interface comprises:
    obtaining, from a user profile repository, at least one of a user preference and personalized service settings associated with the user, for operation of the smart appliance, wherein the user preference comprises a user preferred language.

4. The method of claim 1 wherein receiving scanned input associated with the item, from the scanning component comprises:
    analyzing an item type associated with the scanned input; and determining whether an item identifier associated with the scanned input resides in an item repository and creating the item identifier if the item identifier is not in the item repository.

5. The method of claim 4 further comprising:
determining the item type associated with the scanned input and cataloging the item into an item group.

6. The method of claim 1 wherein requesting cognitive services from the appliance cognitive localization server, the cognitive services integrating localization information with the item information comprises:
determining, based on language information and encoding information associated with the item information and a user preferred language, that the item information is to be translated into the user preferred language as translated item information.

7. The method of claim 6 further comprising:
sending a request to a cognitive service Application Programming Interface (API) for localization information associated with the item information.

8. The method of claim 6 further comprising:
receiving by at least one of the user and an appliance configuration Graphical User Interface (GUI), from a localization assistant interfacing with an appliance localization daemon, localization information and the translated item information to be used, by the smart appliance, during operation by the smart appliance.

9. The method of claim 8 further comprising:
storing the localization information and the translated item information in an item repository.

10. A computer program product for automated localization of information for smart appliances, the computer program product comprising:
a computer readable storage medium having computer readable program code embodied therewith, the program code executable by a computer processor to:
identify a user of the smart appliance via a user interface;
receive scanned input associated with an item, from a scanning component;
request cognitive services from an appliance cognitive localization server, the cognitive services integrating localization information with the item information;
provide the localization information to the smart appliance; and
operate the smart appliance using the localization information and the item information.

11. The computer program product of claim 10 further configured to:
retrieve the localization information and the item information from an item repository during a subsequent scan of the item using the scanning component.

12. The computer program product of claim 10 wherein the computer readable program code configured to request cognitive services from the appliance cognitive localization server, the cognitive services integrating localization information with the item information is further configured to:
determine, based on language information and encoding information associated with the item information and a user preferred language, that the item information is to be translated into the user preferred language as translated item information.

13. The computer program product of claim 12 further configured to:

send a request to a cognitive service Application Programming Interface (API) for localization information associated with the item information.

14. The computer program product of claim 12 further configured to:
receive by at least one of the user and an appliance configuration Graphical User Interface (GUI), from a localization assistant interfacing with an appliance localization daemon, localization information and the translated item information to be used, by the smart appliance, during operation by the smart appliance.

15. The computer program product of claim 14 further configured to:
store the localization information and the translated item information in an item repository.

16. A system comprising:
a computing processor; and
a computer readable storage medium operationally coupled to the processor, the computer readable storage medium having computer readable program code embodied therewith to be executed by the computing processor, the computer readable program code configured to:
identify a user of the smart appliance via a user interface;
receive scanned input associated with an item, from a scanning component;
request cognitive services from an appliance cognitive localization server, the cognitive services integrating localization information with the item information;
provide the localization information to the smart appliance; and
operate the smart appliance using the localization information and the item information.

17. The system of claim 16 further configured to:
retrieve the localization information and the item information from an item repository during a subsequent scan of the item using the scanning component.

18. The system of claim 17 further configured to:
send a request to a cognitive service Application Programming Interface (API) for localization information associated with the item information.

19. The system of claim 17 wherein the computer readable program code configured to request cognitive services from the appliance cognitive localization server, the cognitive services integrating localization information with the item information is further configured to:
determine, based on language information and encoding information associated with the item information and a user preferred language, that the item information is to be translated into the user preferred language as translated item information.

20. The system of claim 19 further configured to:
receive by at least one of the user and an appliance configuration Graphical User Interface (GUI), from a localization assistant interfacing with an appliance localization daemon, localization information and the translated item information to be used, by the smart appliance, during operation by the smart appliance.

21. The system of claim 20 further configured to:
store the localization information and the translated item information in an item repository.

* * * * *